US012594954B2

(12) United States Patent
Rodriguez Hervas et al.

(10) Patent No.: US 12,594,954 B2
(45) Date of Patent: Apr. 7, 2026

(54) PERCEPTION-BASED SIGN DETECTION AND INTERPRETATION FOR AUTONOMOUS MACHINE SYSTEMS AND APPLICATIONS

(71) Applicant: NVIDIA Corporation, Santa Clara, CA (US)

(72) Inventors: Berta Rodriguez Hervas, San Diego, CA (US); Hang Dou, Fremont, CA (US); Hsin-I Chen, Sunnyvale, CA (US); Kexuan Zou, San Jose, CA (US); Nizar Gandy Assaf, San Jose, CA (US); Minwoo Park, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 614 days.

(21) Appl. No.: 17/827,280

(22) Filed: May 27, 2022

(65) Prior Publication Data

US 2022/0379913 A1 Dec. 1, 2022

Related U.S. Application Data

(60) Provisional application No. 63/194,728, filed on May 28, 2021.

(51) Int. Cl.
  *B60W 60/00* (2020.01)
  *G06V 20/56* (2022.01)
  *G06V 20/58* (2022.01)

(52) U.S. Cl.
  CPC ......... *B60W 60/001* (2020.02); *G06V 20/582* (2022.01); *G06V 20/588* (2022.01); (Continued)

(58) Field of Classification Search
  None
  See application file for complete search history.

(56) References Cited

U.S. PATENT DOCUMENTS

2018/0068559 A1* 3/2018 Bjersing ............ G08G 1/09675
2019/0325237 A1* 10/2019 Zhang .................. G06V 20/588
(Continued)

FOREIGN PATENT DOCUMENTS

WO      2022251697 A1   12/2022

OTHER PUBLICATIONS

"Constrained Optimization," Wikipedia (Year: 2013).*
(Continued)

*Primary Examiner* — Lail A Kleinman
(74) *Attorney, Agent, or Firm* — IRON SUMMIT IP LLP

(57) ABSTRACT

In various examples, lanes may be grouped and a sign may be assigned to a lane in a group, then propagated to another lane in the group to associate semantic meaning corresponding to the sign with the lanes. The sign may be assigned to the most similar lane as quantified by a matching score subject to the lane meeting any hard constraints. Propagation of an assignment of the sign to a different lane may be based on lane attributes and/or sign attributes. Lane attributes may be evaluated and assignments of signs may occur for a lane as a whole, and/or for particular segments of a lane (e.g., of multiple segments perceived by the system). A sign may be a compound sign that is identified as individual signs, which are associated with one another. Attributes of the compound sign may provide semantic meaning used to operate a machine.

23 Claims, 15 Drawing Sheets

(52) U.S. Cl.
CPC ... *B60W 2420/403* (2013.01); *B60W 2552/30*
(2020.02); *B60W 2552/53* (2020.02)

(56) References Cited

U.S. PATENT DOCUMENTS

| | | | |
|---|---|---|---|
| 2020/0149896 A1 | 5/2020 | Bush et al. | |
| 2020/0151611 A1 | 5/2020 | McGavran et al. | |
| 2020/0249684 A1 | 8/2020 | Onofrio et al. | |
| 2020/0310450 A1* | 10/2020 | Reschka | B60W 30/12 |
| 2020/0386557 A1* | 12/2020 | Hansson | G05D 1/0214 |
| 2021/0192238 A1* | 6/2021 | Dean | G06V 30/1916 |
| 2022/0172491 A1* | 6/2022 | Tanikawa | G06V 10/82 |
| 2022/0258738 A1* | 8/2022 | Jia | B60W 30/12 |
| 2022/0379913 A1 | 12/2022 | Rodriguez Hervas et al. | |

OTHER PUBLICATIONS

Franke, et al., "Autonomous Driving Goes Downtown", IEEE Intelligent Systems, vol. 13, No. 6, Jan. 1, 1998, 9 pgs.
Hyoungrae, et al., "Lane Positioning in Highways Based on Road-Sign Tracking using Kalman Filter", IEEE International Conference on Systems, Man, and Cybernetics (SMC), Oct. 5, 2014, 6 pgs.
International Search Report and Written Opinion for PCT Application No. PCT/US2022/031435, filed May 27, 2022, mailed Oct. 5, 2022, 14 pgs.
Krizhevsky, et al., "Imagenet Classification with Deep Convolutional Neural Networks", Advances in Neural Information Processing Systems, vol. 25, Curran Associates, Inc., 2012, 9 pgs.
Zhu, Zhe, et al., "Traffic-Sign Detection and Classification in the Wild", Computer Vision Foundation; 2016, 9 pgs.
Arbelaez, P., et al., "Multiscale Combinatorial Grouping"; In Computer Vision and Pattern Recognition, 2014, 8 pgs.
Cheng, M., et al., "BING:Binarized Normed Gradients for Objectness Estimation at 300fps", in IEEE CVPR, 2014.
Ciresan, D.C., et al., A Committee of Neural Networks for Traffic Sign Classification, In International Joint Conference on Neural Networks, pp. 1918-1921, 2011.
Deng, J., et al., "ImageNet: A Large-Scale Heirarchical Image Database", In CPVR09, 2009, 8 pgs.
Erhan, D., et al., "Scalable Object Detection using Deep Neural Networks", https://arxiv.org/abs/1312.2249, Dec. 8, 2013, 8 pgs.
Everingham, M., et al., "The Pascal Visual Object Classes (voc) Challenge", Int. J. Comput. Vision, 88(2):303-338, Jun. 2010, 36 pgs.
Girshick, R., et al., "Rich Feature Hierarchies for Accurate Object Detection and Semantic Segmentation", https://arxiv.org/abs/1311. 2524; Oct. 14, 2014, 21 pgs.
Girshick, R.B.; "Fast R-CNN", https://arxiv.org/abs/1504.08083, Sep. 27, 2015, 9 pgs.
He, K; et al., "Spatial Pyramid Pooling in Deep Convolutional Networks for Visual Recognition", https://arxiv.org/abs/1406.4729; Apr. 23, 2015, 14 pgs.

Hosang, J., "How Good are Detection Proposals, Really?", https://arxiv.org/abs/1406.6962; Jul. 22, 2014, 25 pgs.
Huval, B., et al., "An Empirical Evaluation of Deep Learning on Highway Driving", https://arxiv.org/abs/1504.01716; Apr. 17, 2015, 7 pgs.
Jia, Y., et al., "Caffe: Convolutional Architecture for Fast Feature Embedding", https://arxiv.org/abs/1408.5093; Jun. 20, 2014, 4 pgs.
Jin, J., et al., "Traffic Sign Recognition with Hinge Loss Trained Convolutional Neural Networks", IEEE Transactions on Intelligent Transportation Systems, 15(5):1991-2000, 2014.
Lin, T., et al., "Microsoft COCO: Common Objects in Context"; https://arxiv.org/abs/1405.0312; Feb. 21, 2015, 15 pgs.
Lu, K., et al., "Sparse-Representation-Based Graph Embedding for Traffic Sign Recognition"; IEEE Transactional on Intelligent Transportation Systems, 13(4): 1515-1524, 2012.
Maldonado-Bascon, S., et al., "Road-Sign Detection and Recognition Based on Support Vector Machines" Intelligent Transportation Systems, IEEE Transactions on, 8(2):264-278, Jun. 2007.
Ren, S., et al., "Faster R-CNN: Towards Real-Time Object Detection with Region Proposal Networks"; https://arxiv.org/abs/1506. 01497; Jan. 6, 2016; 14 pgs.
Russakovsky, O., et al., "ImageNet Large Scale Visual Recognition Challenge"; https://arxiv.org/abs/1409.0575; Jan. 30, 2015, 43 pgs.
Sermanet, P., et al., "Overfeat: Integrated Recognition, Localization and Detection Using Convolutional Networks"; https://arxiv.org/abs/1312.6229; Feb. 24, 2014, 16 pgs.
Sermanet, P., et al., "Traffic Sign Recognition with Multi-Scale Convolutional Networks"; In Neural Networks (I-JCNN), The 2011 International Joint Conference on, pp. 2809-2813, Jul. 2011, 5 pgs.
Simonyan, K., et al., "Very Deep Convolutional Networks for Large-Scale Image Recognition"; https://arxiv.org/abs/1409.1556; Apr. 10, 2015; 14 pgs.
Stallkamp, J., et al., "The German Traffic Sign Recognition Benchmark: A Multi-Class Classification Competition"; In Neural Networks (IJCNN), The 2011 International Joint Conference on, pp. 1453-1460, IEEE, 2011, 8 pgs.
Stallkamp, J., et al., "Man vs. Computer: Benchmarking Machine Learning Algorithms for Traffic Sign Recognition"; Neural Networks, (0):-, 2012, 7 pgs.
Szegedy, C., et al., "Going Deeper with Convolutions", https://arxiv.org/abs/1409.4842; Sep. 17, 2014, 12 pgs.
Szegedy, C., et al., "Scalable, High-Quality Object Detection", https://arxiv.org/abs/1412.1441; Dec. 9, 2015, 10 pgs.
Szegedy, C., et al., "Deep Neural Networks for Object Detection"; In C. Burges, L. Bottou, M. Welling, Z. Ghahramani, and K. Weinberger, editors, Advances in Neural Information Processing Systems 26, pp. 2553-2561. 2013, 9 pgs.
Uijlings, J., et al., "Selective Search for Object Recognition"; International Journal of Computer Vision, 2013, 14 pgs.
Zitnick, C.L., et al., "Edge Boxes: Locating Object Proposals from Edges", In ECCV. European Conference on Computer Vision, Sep. 2014, 15 pgs.
Rodriguez Hervas, Berta; International Preliminary Report on Patentability for PCT Application No. PCT/US2022/031435, May 27, 2022, mailed Dec. 7, 2023, 11 pgs.

* cited by examiner

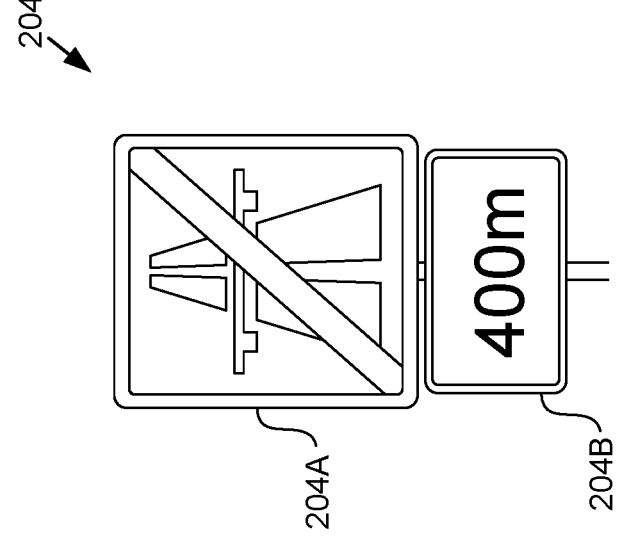
204
204A
204B
400m
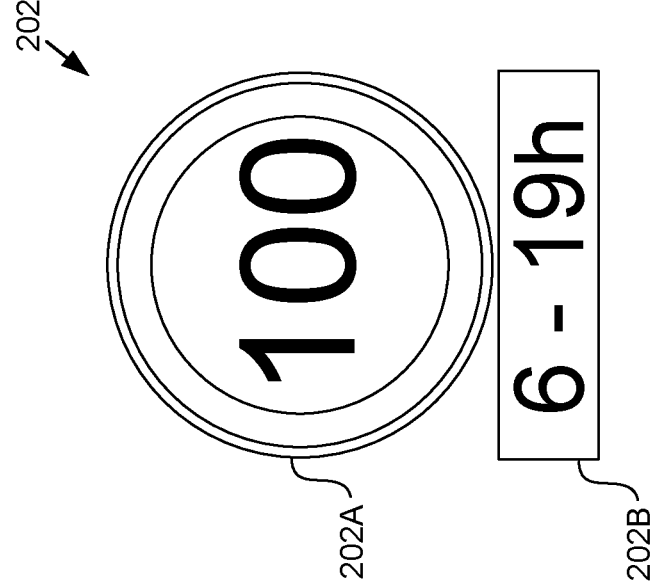
202
202A
202B
100
6 - 19h
FIGURE 2

300

| Sign | Meaning | dwSpeedLimit | Name in Software |
|---|---|---|---|
| | Entering highway:<br>• Multi-lane is guaranteed.<br>• Max speed = unlimited<br>• 50 km/h if sight < 50m<br>• Min speed = 60<br>• Advisory speed = 130 | | EUMotorWay |
| | Exiting highway:<br>• Rescind multi-lane<br>• Rescind minimal speed | Set dwSpeedLimit to ruralSpeedLimit unless seeing other speed limit signs. | EUMotorWayEnd |
| | Entering residential area:<br>• Maximum speed: at walking speed, the exact definition may vary from countries to countries. | Set dwSpeedLimit to walkingSpeedL (10 km/h) | EUTrafficCalmingZone |
| | Exiting a residential area:<br>• Rescind residential area max speed | Set dwSpeedLimit to ruralSpeedL unless seeing other speed limit signs. | EUTrafficCalmingZoneEnd |
| Wilster | Entering urban areas:<br>• Maximum speed: 50 km/h | Set dwSpeedLimit to urbanSpeedLimit | EUUrbanArea |
| Schotten⇑<br>Wilster | Leaving urban areas:<br>• Rescind urban area max speed limit | Set dwSpeedLimit to ruralSpeedLimit unless seeing other speed limit signs. | EUUrbanAreaEnd |
| | Entering Expressway<br>If currently urban, remains "urban"<br>Otherwise:<br>If currently only one lane in our direction:<br>• remains rural speed-limit Maximum: 100, min 60)<br>Else:<br>• If at least 2 lanes in our direction: Regulations | Set dwSpeedLimit to | EUFastTraffic |

DETECT AT LEAST ONE LANE AND AT LEAST ONE SIGN
B502

CLASSIFY THE AT LEAST ONE SIGN AS ONE OR MORE SIGN TYPES
B504

ASSIGN THE AT LEAST ONE SIGN TO AT LEAST ONE LANE BASED AT LEAST ON ONE OR MORE SIGN ATTRIBUTES AND ONE OR MORE LANE ATTRIBUTES
B506

PERFORM ONE OR MORE OPERATIONS BY AN AUTONOMOUS MACHINE
B508

600
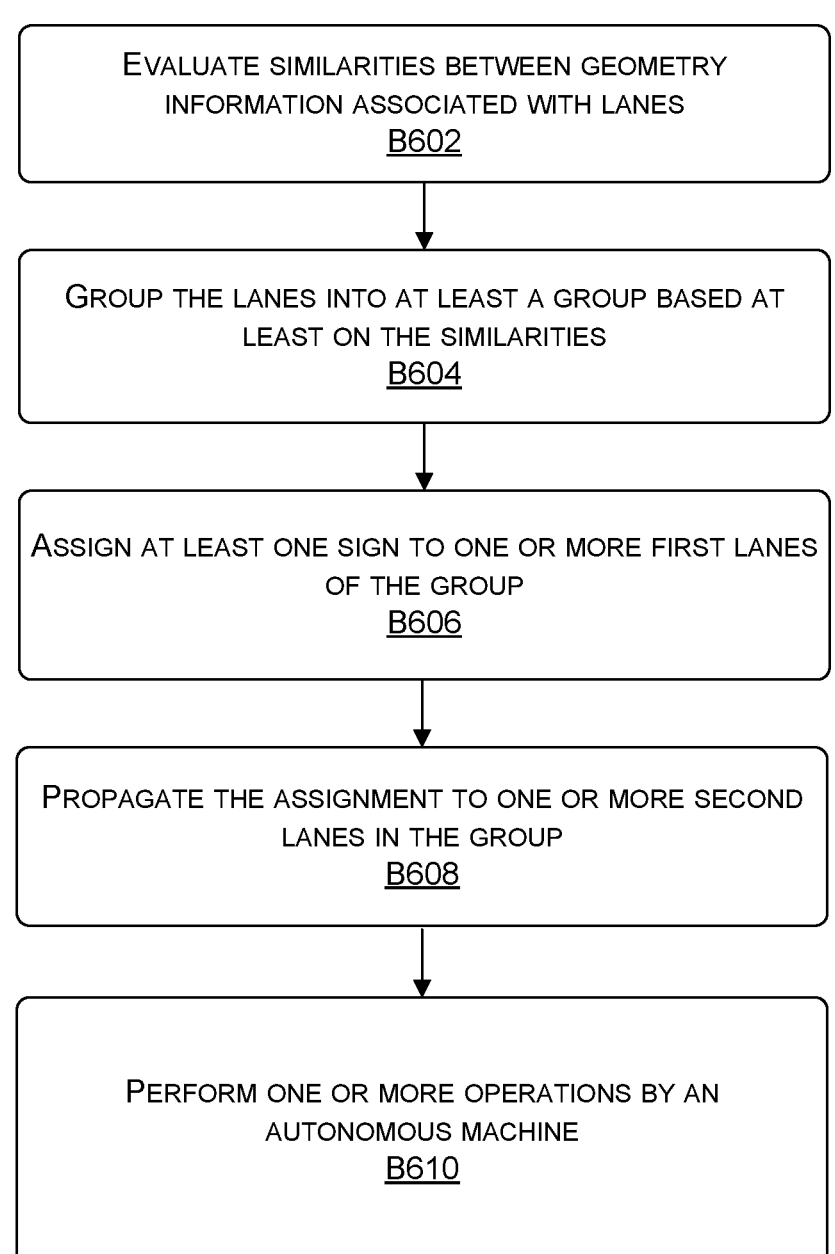
EVALUATE SIMILARITIES BETWEEN GEOMETRY
INFORMATION ASSOCIATED WITH LANES
B602
GROUP THE LANES INTO AT LEAST A GROUP BASED AT
LEAST ON THE SIMILARITIES
B604
ASSIGN AT LEAST ONE SIGN TO ONE OR MORE FIRST LANES
OF THE GROUP
B606
PROPAGATE THE ASSIGNMENT TO ONE OR MORE SECOND
LANES IN THE GROUP
B608
PERFORM ONE OR MORE OPERATIONS BY AN
AUTONOMOUS MACHINE
B610
FIGURE 6

700
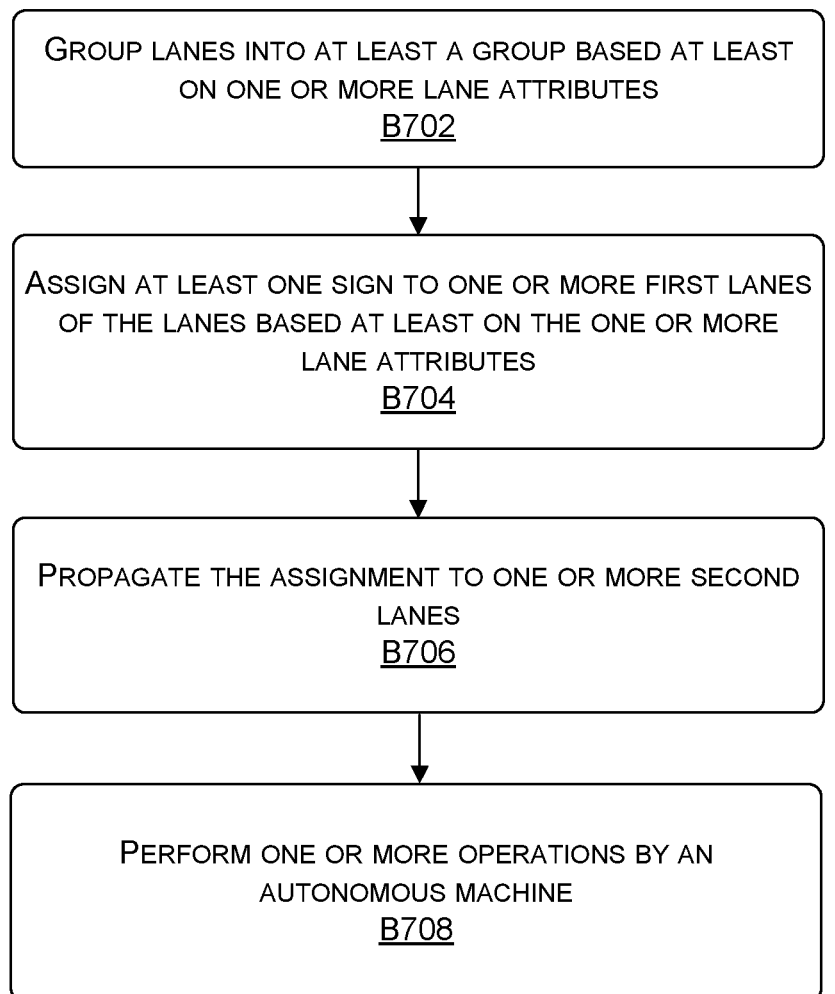
GROUP LANES INTO AT LEAST A GROUP BASED AT LEAST
ON ONE OR MORE LANE ATTRIBUTES
B702
ASSIGN AT LEAST ONE SIGN TO ONE OR MORE FIRST LANES
OF THE LANES BASED AT LEAST ON THE ONE OR MORE
LANE ATTRIBUTES
B704
PROPAGATE THE ASSIGNMENT TO ONE OR MORE SECOND
LANES
B706
PERFORM ONE OR MORE OPERATIONS BY AN
AUTONOMOUS MACHINE
B708
FIGURE 7

800
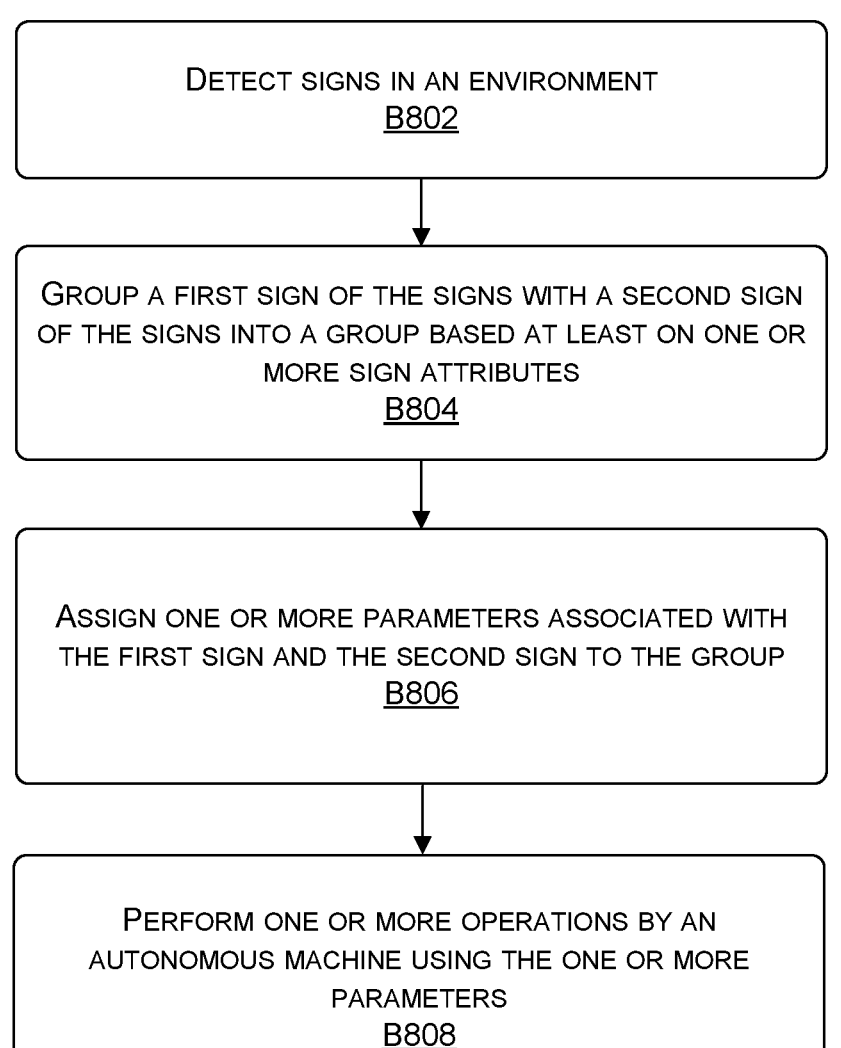
DETECT SIGNS IN AN ENVIRONMENT
B802
GROUP A FIRST SIGN OF THE SIGNS WITH A SECOND SIGN
OF THE SIGNS INTO A GROUP BASED AT LEAST ON ONE OR
MORE SIGN ATTRIBUTES
B804
ASSIGN ONE OR MORE PARAMETERS ASSOCIATED WITH
THE FIRST SIGN AND THE SECOND SIGN TO THE GROUP
B806
PERFORM ONE OR MORE OPERATIONS BY AN
AUTONOMOUS MACHINE USING THE ONE OR MORE
PARAMETERS
B808
FIGURE 8

900

DETECT A SIGN IN AN ENVIRONMENT
B902

CLASSIFY THE DETECTED SIGN WITH A SIGN TYPE
B904

DETERMINE A 3D POSITION OF THE SIGN IN THE
ENVIRONMENT
B906

ASSOCIATE THE 3D POSITION WITH ONE OR MORE DRIVING
PATHS TO WHICH THE SIGN APPLIES
B908

DETERMINE AT LEAST ONE SPEED LIMIT CORRESPONDING
TO THE SIGN BASED AT LEAST ON ONE OR MORE LOCAL
RULES OR REGULATIONS
B910

SERVER(S) 1078

CPU 1080(B)

PCIE SWITCH 1082(D)

PCIE SWITCH 1082(C)

GPU 1084(F)

GPU 1084(H)

GPU 1084(E)

GPU 1084(G)

1086

PCIE SWITCH 1082(B)

CPU 1080(A)

PCIE SWITCH 1082(A)

GPU 1084(B)

GPU 1084(D)

1088

GPU 1084(A)

GPU 1084(C)

1000

1094

1092

NETWORK(S) 1090

1076

1100

1200

PERCEPTION-BASED SIGN DETECTION AND INTERPRETATION FOR AUTONOMOUS MACHINE SYSTEMS AND APPLICATIONS

CROSS-REFERENCE TO RELATED APPLICATIONS

This application claims the benefit of U.S. Provisional Application No. 63/194,728, filed on May 28, 2021, which is hereby incorporated by reference in its entirety.

BACKGROUND

The ability to accurately and precisely detect and interpret signs in an environment is imperative for advanced driver-assistance systems (ADAS) and autonomous machine applications at all levels of autonomy—e.g., semi-autonomous vehicles to fully-autonomous vehicles. For example, if an autonomous vehicle does not properly detect or interpret a road sign that indicates a speed limit, planning and control processes may not be able to ensure the vehicle is traveling at a legal speed. However, designing a system to autonomously detect and interpret signs is tremendously difficult. A sign may define driving guidelines that apply to some lanes and not others, apply under some conditions and not others, or apply differently under different conditions. Additionally, there may be many variations in the types of signage possible, including differences in regional lane and road marking conventions, differences in semantic meaning for visually similar or identical signs, and signs that when present modify or otherwise define the semantic meaning of other signs.

Conventional systems use information from sensors (e.g., image, RADAR, etc.) and other devices of a perception system to localize a vehicle to a High Definition (HD) map that contains detailed information about nearby signs, along with the semantic meaning of those signs. However, due to errors in localization, using this approach may result in detecting a sign significantly after passing the sign. Thus, a vehicle may travel at an incorrect speed until the sign is registered and accounted for in planning and control. Additionally, information in the HD map may be outdated, resulting in outdated signs being followed or new signs being missed. Further, these approaches are typically incapable of applying semantic meaning of different signs to different lanes.

SUMMARY

In contrast to conventional systems, such as those described above, the systems and methods of the present disclosure provide for using perception systems of machines (e.g., vehicles, robots, etc.) to detect and/or interpret signs and lanes—such as to associate signs with lanes. In one or more embodiments, lanes may be grouped into at least one group. One or more signs may be assigned to at least one lane in a group, then propagated to one or more other lanes in the group in order to associate semantic meaning corresponding to the one or more signs with the lanes. A set of criteria may be used to compute a matching score between one or more of the lanes with respect to a sign and/or to eliminate one or more of the lanes from consideration. In one or more embodiments, the sign may be assigned to the most similar lane as quantified by the matching scores subject to the lane meeting any hard constraints. In one or more embodiments, propagation of an assignment of a sign to a different lane may be based at least on lane attributes and/or sign attributes associated with the different lane and the sign and/or lane assigned to the sign (e.g., based at least on a propagation score exceeding a threshold value). Lane attributes may be evaluated and assignments of signs may occur for a lane as a whole, and/or for particular segments of a lane (e.g., of multiple segments perceived by the system).

Aspects of the disclosure further provide approaches for identifying compound signs. A compound sign may be identified as individual signs, which are associated with one another. For example, one or more MLMs (e.g., as described herein) may be trained to detect signs, then a compound sign comprising a plurality of the signs may be determined based at least on one or more sign attributes of the signs. Attributes of the compound sign may be determined to dictate one or more rules associated with operating a machine.

BRIEF DESCRIPTION OF THE DRAWINGS

The present systems and methods for perception-based sign detection and interpretation are described in detail below with reference to the attached drawing figures, wherein:

FIG. 2 depicts examples of primary signs and associated secondary signs, in accordance with some embodiments of the present disclosure;

FIG. 3 depicts examples of base rules which may be parsed to determine one or more aspects of semantic meanings of signs, in accordance with some embodiments of the present disclosure;

FIG. 6 is a flow diagram for a method for propagating an assignment of at least one sign to at least one lane based at least on similarities between geometry information between lanes, in accordance with some embodiments of the present disclosure;

FIG. 7 is a flow diagram for a method for propagating an assignment of at least one sign to at least one lane based at least on lane attributes, in accordance with some embodiments of the present disclosure;

FIG. 8 is a flow diagram for a method for grouping signs, in accordance with some embodiments of the present disclosure;

DETAILED DESCRIPTION

Figure 1:
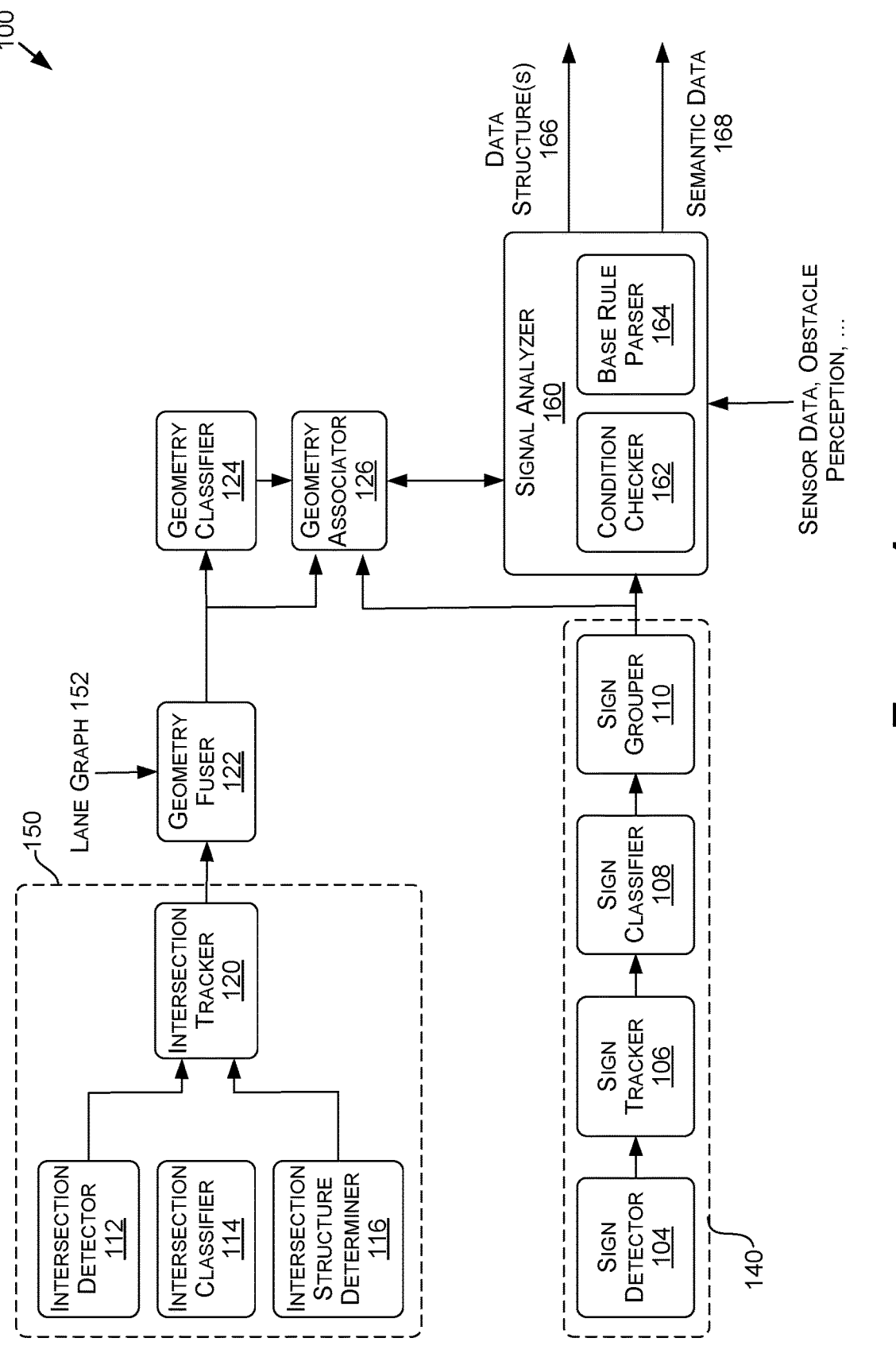
FIG. 1 depicts an example perception-based sign detection and interpretation system, in accordance with some embodiments of the present disclosure.

Systems and methods are disclosed related to perception-based sign detection and interpretation. Although the present disclosure may be described with respect to an example autonomous vehicle 1000 (alternatively referred to herein as "vehicle 1000" or "ego-vehicle 1000," an example of which is described with respect to FIGS. 1000A-1000 D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to detecting an interpreting signs (e.g., regulatory signs such as traffic or parking signs, road signs, and/or building signs, etc.) in autonomous vehicle applications, this is not intended to be limiting, and the systems and methods described herein may be used in augmented reality, virtual reality, mixed reality, robotics, security and surveillance, autonomous or semi-autonomous machine applications, and/or any other technology spaces where hazard or object detection may be used. Further, although the present disclosure may be described with respect to assigning signs to lanes or grouping lanes, this is not intended to be limiting, and lanes may be generalized to 2D or 3D regions in the environment, such as parking spaces, buildings, parking lots, hallways, aisles, seats, shelves, etc.

The present disclosure relates to perception-based sign detection and interpretation. More specifically, the disclosure relates to techniques for detecting signs and interpreting the semantic meaning of signs in relation to the environment. For example, approaches are provided for identifying compound signs that have multiple parts, such as plaques, as well as for determining and assigning semantic meaning to lanes or lane segments. A perception-based sign detection and interpretation methodology according to one or more embodiments includes: detecting a sign, classifying a sign type of the sign, triangulating a 3D position of the sign, associating that 3D position with driving paths to which the sign applies, and interpreting the maximum, minimum and advisory speed limits implied by the sign based at least on local rules and regulations. Sign-to-path relevance information provided by a live perception system in accordance with various embodiments of the disclosure can be fused with information from a map (e.g., an HD map) to further enhance robustness and provide coverage in a wide range of real-world scenarios.

In contrast to conventional systems, the disclosure provides approaches that may use perception systems of autonomous machines, such as vehicles, to detect and/or interpret signs and lanes, such as to associate signs with lanes. Aspects of the disclosure provide approaches for associating one or more signs with one or more lanes. In one or more embodiments, lanes may be grouped into at least one group. One or more signs may be assigned to at least one lane in a group, then propagated to one or more other lanes in the group. Using this approach, the system may assign a sign(s) to a lane(s) that the system determines is most highly correlated with the sign. Similarities between lanes may then be used to identify one or more other lanes associated with the sign that otherwise may not be as overtly correlated with the sign. Thus, signs may be accurately associated with lanes.

In one or more embodiments, lanes may be grouped based at least on evaluating similarities between associated attributes of the lanes. The lanes and/or the attributes may be derived from sensor data generated using at least one sensor of a machine (e.g., a vehicle), for example, using one or more machine learning models (MLMs), such as Convolutional Neural Networks (CNNs). Examples of the lane attributes are those that represent geometry of lanes (e.g., curvature, shape, coordinates, lane boundaries), lane type (e.g., left-turn lane, right-turn lane, exit lane, fork, merge, carpool lane), lane direction of travel, lane roadmarks (e.g., left-turn symbol, right-turn symbol, carpool symbol), and/or lane status (e.g., ego vehicle lane, non-ego vehicle lane). Similarities may be evaluated based on analyzing visual and/or spatial similarities in features (e.g., roadmarks, geometric coordinates, etc.) and/or classes assigned to the lanes (e.g., outputs of an MLM(s)) and extracted from the second data (e.g., from one or more images using one or more CNNs). For example, a metric based on spatial similarity in geometry between lanes may correspond to a Euclidean distance between integral curvature values of lanes, a root mean square deviation of lanes after alignment by rigid or non-rigid transformation (e.g., variant rigid or non-rigid iterative closest point methods), etc.

In one or more embodiments, a sign may be assigned to a lane based at least on correlating one or more lane attributes associated with the lane with one or more sign attributes associated with the sign. The signs and/or the attributes may also be derived from sensor data generated using at least one sensor of an autonomous machine (e.g., at least some of the same sensor data as the lanes), for example, using one or more MLMs, such as one or more CNNs. Examples of sign attributes are those that represent a sign type (e.g., regulatory speed limit sign, exit sign, left-turn signal sign, right-turn signal sign, advisory speed limit sign, school zone sign, variable speed limit sign, parking sign, enter sign, exit sign, merge sign, and many more), whether a sign is a primary sign or a supplemental sign (e.g., a sign that modifies the semantic meaning of a primary sign), and/or geometry of signs (e.g., bounding boxes, contours, coordinates, shapes).

As with lane attributes, one or more of the attributes of a sign may represent a class assigned to the sign according to an output of one or more of the MLMs and/or may be associated with the sign based on one or more classifications of the sign (e.g., according to the one or more MLMs). For example, in one or more embodiments, image data corresponding to a bounding shape of a sign may be extracted from sensor data (e.g., image data) and input to one or more MLMs. In at least one embodiment, the image data may be extracted using one or more object detectors configured and/or trained to detect bounding shapes of signs (e.g., traffic signs) and/or other objects. Signs may be detected and tracked over any number of frames, for example, using an object tracker. The MLM(s) may be trained to classify the sign according to any number of potential classes (e.g., as many as 300 in some embodiments). One or more of the sign attributes may be associated with each class (e.g., in a data structure in advance of classification), such as whether the sign is a primary or supplemental sign, the sign type, one or more rules and/or conditions on rules associated with the sign, etc. Additionally or alternatively, one or more of the sign attributes that represent geometry of a sign may correspond to one or more of the bounding shapes associated with the sign.

One or more of the sign attributes may be selected (e.g., from a plurality of options) by the system based on the system determining one or more criteria are satisfied, such as location based criteria determined using localization processes which may use Global Positioning Systems (GPS). For example, semantic attributes that encode the semantic meaning of a sign may vary to conform to regional differences.

Correlating one or more lane attributes associated with the lane with one or more sign attributes associated with the sign may include comparing, evaluating, mapping, matching, and/or otherwise analyzing sign attributes with respect to lane attributes to ensure the semantic, visual, and/or spatial compatibility between the attributes. In at least one embodiment, various factors, such as soft and/or hard constraints may be applied in correlating a sign to a lane and may be encoded in a set of criteria of the sign. The set of criteria may be used to compute a matching score between one or more of the lanes with respect to the sign and/or to eliminate one or more of the lanes from consideration. In one or more embodiments, the sign may be assigned to the most similar lane as quantified by the matching scores subject to the lane meeting any hard constraints. For example, an exit speed sign may not be assigned to a non-exit lane even if they are geometrically close to each other. Instead, an exit speed sign may be assigned to a lane that the system determines has one or more attributes associated with an exit lane, such as being classified as an exit lane, including a roadmark corresponding to an exit lane, having a geometry or other spatial properties consistent with or associated with an exit lane and that is determined to have the highest matching score amongst other exit lanes, if present.

In one or more embodiments, propagation of a sign to another lane may only occur within a group. In other examples, propagation may cross groups. In one or more embodiments, propagation rules for a sign may be encoded in one or more semantic attributes of a sign. For example, a sign with the attribute of being an electronic variable speed limit sign may have a rule that it cannot be propagated to another lane, as it only applies to one lane. Other signs may have various other hard or soft constraints on propagation. In one or more embodiments, propagation of an assignment of a sign to a different lane may be based at least on lane attributes and/or sign attributes associated with the different lane and the sign and/or lane assigned to the sign. For example, a propagation score may be computed using similar or different factors than the matching score. In one or more embodiments, a sign may be propagated based at least on the propagation score for the other lane exceeding a threshold value.

In one or more embodiments, lane attributes may be evaluated and assignments of signs may occur for a lane as a whole, and/or for particular segments of a lane (e.g., of multiple segments perceived by the system). For example, a sign may be assigned to a segment of a lane based at least on determining a location associated with the sign along the lane (e.g., in an image). Multiple signs may be assigned to one lane and/or different segments of the same lane may be assigned different signs. In one or more embodiments, after assignment and propagation between signs and lanes, each lane may have multiple associated signs which divide the lane into multiple segments. Then, one or more lane segments of a lane may be merged by the associated sign attributes (e.g., sign type, distance to the lane, and so on) and traffic rules encoded in sign attributes (e.g. electric signs overwrite paint signs) to generate final lane segments and resolve which sign attributes are assigned to the lane segments (e.g. max speed, min speed, and advisory speed). The sign attributes may then be used to control the autonomous vehicle or other machine.

Aspects of the disclosure provide approaches for identifying compound signs. Rather than identifying a sign that has multiple parts, such as plaques, as a single entity, in one or more embodiments, a compound sign may be identified as individual signs, which are associated with one another. For example, one or more MLMs (e.g., as described herein) may be trained to detect signs, then a compound sign comprising a plurality of the signs may be determined based at least on one or more sign attributes of the signs. Attributes of the compound sign may be determined to dictates one or more rules associated with operating a machine.

In one or more embodiments, a sign may be grouped with another sign based at least on the sign having a sign attribute representing and/or indicating a supplemental sign and the other sign having a sign attribute representing and/or indicating a primary sign. Grouping the signs may further be based at least on a spatial proximity of the signs. For example, spatial attributes of the signs, such as coordinates (e.g., corresponding to shape coordinates of the signs identified using the object detector), may be compared along with semantic attributes to find the most highly correlated sign (e.g., according to correlation scores or other metrics). By way of example and not limitation, a correlation score may be based at least on a distance computed between a primary sign and a supplemental sign based at least on a Euclidean distance between a center point of a bottom edge of the sign on the top and a center point of the top edge of the sign below. However, the reference points used to evaluate spatial proximity may be different depending on the attributes of the signs. For example, primary signs may have supplemental signs above them, below them, to the side, and/or may have other potential spatial configurations. The system may evaluate one or more of these spatial configurations, and the configurations that are evaluated may be based on one or more attributes of the primary and/or supplemental signs (e.g., to limit evaluation to particular configurations).

Aspects of the disclosure may be used to implement a perception-based Speed Assist System (SAS) providing information about maximum, minimum, and advisory speed limit information to active safety and behavioral planner functional blocks of an autonomous or semi-autonomous machine.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine loco-motion, machine driving, synthetic data generation, model training, perception, augmented reality, virtual reality, mixed reality, robotics, security and surveillance, simulation and digital twinning, autonomous or semi-autonomous machine applications, deep learning, environment simula-tion, object or actor simulation and/or digital twinning, data center processing, conversational AI, light transport simu-lation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial sys-tems, medial systems, boating systems, smart area monitor-ing systems, systems for performing deep learning opera-tions, systems for performing simulation operations, systems for performing digital twin operations, systems implemented using an edge device, systems incorporating one or more virtual machines (VMs), systems for perform-ing synthetic data generation operations, systems imple-mented at least partially in a data center, systems for performing conversational AI operations, systems for per-forming light transport simulation, systems for performing collaborative content creation for 3D assets, systems imple-mented at least partially using cloud computing resources, and/or other types of systems.

Referring now to FIG. 1, FIG. 1 depicts an example perception-based sign detection and interpretation system 100 (also referred to as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autono-mous vehicle 1000 of FIGS. 10A-10D, example computing device 1100 of FIG. 11, and/or example data center 1200 of FIG. 12.

The system 100 may include, amongst other components, a geometry fuser 122, a geometry classifier 124, a geometry associator 126, a signal perceiver 140, a geometry perceiver 150, and/or a signal analyzer 160. The signal perceiver 140 may include a sign detector 104, a sign tracker 106, a sign classifier 108, and/or a sign grouper 110. The geometry perceiver 150 may include an intersection detector 112, an intersection structure determiner 116, and/or an intersection tracker 120. The signal analyzer 160 may include a condi-tion checker 162 and/or a base rule parser 164.

As an overview, the signal perceiver 140 may be config-ured to perceive signals, such as those corresponding to signs, which may include the sign detector 104 detecting one or more signs, the sign tracker 106 using the detections to track the one or more signs, the sign classifier 108 using the tracked one or more signs to classify the one or more signs, and/or the sign grouper 110 grouping the one or more signs into one or more groups based at least on the classification.

The geometry perceiver 150 may be configured to per-ceive geometry corresponding to intersections, which may include the intersection detector 112 detecting one or more intersections, the intersection structure determiner 116 deter-mining the structure of the one or more intersections, and/or the intersection tracker 120 tracking the one or more inter-sections using the intersection detections and determined structure. The geometry fuser 122 may fuse the tracked one or more intersections with one or more lane graphs 152. The geometry classifier 124 may use the fused geometry and lane graphs 152 to categorize the fused geometries into discrete classes (e.g., "left turn," "straight," "right turn," "U-turn," and the like). The geometry associator 126 may use the fused geometry, the geometry classifications, and/or the sign sig-nals to associate signals (e.g., signs) with paths.

The signal analyzer 160 may be configured to generate one or more data structures 166 and/or semantic data 168 corresponding to the environment using the sign signals in association with the paths. Where the one or more data structures 166 are generated, the one or more data structures 166 may encode geometries of one or more paths, lanes, intersections, and/or other regions of the environment, which may be used to control a machine in navigating the environment. Where the semantic data 168 is generated, the semantic data 168 may include one or more parameters corresponding to the one or more regions of the environ-ment, such as one or more speed limits or other data which may be used to control the machine (e.g., the vehicle 1000) in navigating the environment. The condition checker 162 of the signal analyzer 160 may be configured to determine which signals (e.g., sign signals) are valid or invalid (or active or inactive) based at least on one or more perceived and/or determined conditions of the environment. In one or more embodiments, the condition checker 162 may resolve one or more conditional signs using input from other system modules. The base rule parser 164 may be configured to parse base rules to derive the meaning or semantics of the sign signals (e.g., parameters), such as implicit speed limits (e.g., entry/exit to/from highway, entry/exit to/from urban). In one or more embodiments, the base rule parser 164 may parse a final wait state (e.g., yield, slow down, take way and so on) for each lane based at least on the attributes and/or parameters of the signs attached to them.

Detection, classification, grouping, and/or tracking described herein may be implemented algorithmically and/or using one or more machine learning models (MLMs). For example, and without limitation, an MLM(s) described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algo-rithms, gradient boosting algorithms, neural networks (e.g., auto-encoders, convolutional, recurrent, perceptrons, Long/ Short Term Memory (LSTM), Hopfield, Boltzmann, deep belief, deconvolutional, generative adversarial, liquid state machine, etc.), and/or other types of machine learning models. In various examples, an MLM may include one or more convolutional neural networks (CNNs).

As described herein, the signal perceiver 140 may be configured to perceive signals, such as those corresponding to signs in the environment. For example, the signal per-ceiver 140 may include the sign detector 104 to detect (e.g., using one or more MLMs) one or more traffic signs (and/or other signs) in an environment (e.g., in one or more video frames and/or images) and output bounding shapes, such as two-dimensional (2D) bounding boxes around the signs. In embodiments, the sign tracker 106 of the signal perceiver 140 may accumulate and smooth the sign detection(s) over several consecutive frames. Three-dimensional (3D) position and orientation of the signs may be derived via triangulation (e.g., of detections of the same object in multiple frames) and/or using other localization techniques. The sign classifier 108 of the signal perceiver 140 may classify the detected signs (e.g., using one or more MLMs, such as a Classification DNN).

The sign grouper 110 of the signal perceiver 140 may group one or more signs based on the classifications. For example, in one or more embodiments, the sign grouper 110 may group one or more primary signs with one or more supplemental signs to associate the grouped signs. In at least one embodiment, a primary sign(s) may define one or more rules (e.g., traffic rules) and a secondary sign(s) may impose one or more conditions on those rules defined by the primary sign. For example, some signs may provide information through several plaques—a main plaque corresponding to a primary sign with signage information and a supplemental plaque corresponding to a secondary sign that encodes one or more conditions (e.g., a time limit, a distance limit, etc.) on the main plaque.

To group signs, the sign grouper 110 may use 2D coordinates of detected signs (e.g., determined using the sign detector 104) as inputs as well as the semantic meaning of detected signs in the form of one or more semantic attributes. Signs classified by the sign classifier 108 as a supplemental sign may be grouped with a corresponding sign classified by the sign classifier 108 as a primary sign based at least on finding the closest primary sign in the 2D space. In one or more embodiments, the sign grouper 110 may compute the distance between primary and supplemental signs. The distance between a primary sign and a supplemental sign may be measured, for a non-limiting example, by the Euclidean distance between a center point of the bottom edge of the sign on the top and the center point of the top edge of the sign below (the points may be different based on the sign type assigned to the primary and/or secondary sign).

After the sign grouper 110 groups primary signs with secondary signs, if any, the signs and/or groups of signs may be encoded using in a data structure 166. In various examples, the signal analyzer 160 may determine the semantic data 168 for a group of signs, which may also be referred to as a composite sign.

Referring now to FIG. 2, FIG. 2 depicts examples of primary signs 202A and 204A and associated secondary signs 202B and 204B, in accordance with some embodiments of the present disclosure. For example, FIG. 2 shows the primary sign 202A (e.g., a 100 MPH sign) and the secondary sign 202B (e.g., a between 6-19 h sign). The sign grouper 110 may determine a group 202 including the primary sign 202A and the secondary sign 202B. FIG. 2 also shows the primary sign 204A (e.g., a highway exiting sign) and the secondary sign 204B (e.g., a 400 m sign). The sign grouper 110 may determine a group 204 including the primary sign 204A and the secondary sign 204B.

Returning to FIG. 1, the geometry classifier 124 may use fused geometry and lane graphs 152 to categorize the fused geometries into discrete classes (e.g., "left turn," "straight," "right turn," "U-turn," and the like). In one or more embodiments, the geometry classifier 124 may classify lanes, and input lanes may be grouped into groups or bundles of one or more lanes by the geometry associator 126 based at least one the classifications. In various examples, the geometry associator 126 may use the fused geometry, the geometry classifications, and the sign signals to associate signals (e.g., signs) with paths. The lane groups may be used to help propagate sign attributes among the lanes, as described herein. Certain signs may only apply to certain lane groups. For example, in one or more embodiments, an exit speed sign may only apply to exit lanes, such that non-exit lanes do not use the speed value of an exit speed sign.

By way of example, and not limitation, the geometry associator 126 may group lanes by one or more attributes, such as: lane information from lane or path perception, roadmarks from roadmark perception, and/or lane geometric signature or shape. The lane information may be provided, for example, from the lane graph 152 and/or the geometry classifier 124. The given lanes from lane or path perception may carry lane information attributes (e.g., ego, fork, merge, directions, and so on). The geometry associator 126 may also associate roadmarks with the lanes to extend the lane information. For example, a left turn only roadmark can indicate the lane is a left turn lane while this information might be missed from lane perception.

With the lane information (e.g., lane type, lane boundary type, and roadmarks), the geometry associator 126 may divide the lanes into one or more initial groups. Then the geometry associator 126 may refine the one or more initial groups, such as to create one or more finer groups, based at least on analyzing the lanes' geometric signature. For example, the geometry associator 126 may group lanes based at least on those lanes have similar shapes. The geometry associator 126 may use a metric to measure lane similarity for grouping, which can be defined in various possible ways. For example, the metric may be based at least one the Euclidean distance of the integral curvature value between lanes, the root mean square deviation of lanes after alignment by rigid or non-rigid transformation (e.g., using variant rigid or non-rigid iterative closest point methods), and so on. In one or more embodiments, the metric may score each lane pair for similarity to group the most similar lanes.

Before or after the geometry associator 126 groups lanes, the geometry associator 126 may filter one or more lanes from the groups that the ego vehicle does not travel on, such as the ego contender lanes or the lanes in the ego lane's opposite direction (e.g., as indicated by the attributes).

The geometry associator 126 may additionally or alternatively assign signals (e.g., the signs, sign groups, and/or lights) to one or more of the lanes and/or groups of lanes. The input signs (or sign groups) used by the geometry associator 126 may have been classified and carry various attribute information, as described herein. Each sign's semantic meaning (or attributes) may be parsed by rules, for example, based at least on geographic region and/or other criteria to determine one or more parameters which may be used to control an autonomous machine 1000 (e.g., encoded in the data structure 166 and/or the semantic data 168). For example, in Germany, an "enter motorway sign" may indicate parameters of an unrestricted max speed, a 60 KPH min speed, and a 130 KPH advisory speed. In Sweden, the same sign may indicate a 110 KPH max speed, but no min speed, and no advisory speed.

The meaning of the sign (e.g., parameters) may be interpreted using the base rule parser 164 of the signal analyzer 160. The base rule parser 164 may be used to derive implicit speed limits (e.g., entry/exit to/from highway, entry/exit to/from urban) and may take into account environmental and/or vehicle conditions, such as geographic region, weather, road conditions, etc. In various embodiments, interpretation of a sign may be based at least on local regulations and/or rules of the road.

Referring now to FIG. 3, FIG. 3 depicts examples of base rules 300 which may be parsed to determine one or more aspects of semantic meanings of signs, in accordance with some embodiments of the present disclosure. In the example of FIG. 3, the base rules 300 may be parsed per European Union country.

In one or more embodiments, the geometry associator 126 may assign each sign to its closest lane (e.g., according to semantic similarity and/or physical location). The geometry associator 126 may determine the distance (e.g., a distance or similarity metric) between each sign and lane pair based at least on the sign attributes and lane attributes, examples of which may include the sign geometry and the lane geometry. For example, in one or more embodiments, the geometry associator 126 won't assign an exit speed sign to a non-exit lane even if they are geometrically close to each other as the geometry associator 126 may determine the lane and sign types are not compatible.

The geometry associator 126 may propagate each sign from its closest lane to one or more other lanes. In one or more embodiments, propagation only happens within each lane group. Whether a sign can be propagated to lanes in a group (which in some embodiments may be limited to adjacent lanes) may be based at least on the sign attributes and lane attributes including the sign geometry and the lane geometry. For example, in one or more embodiments, the geometry associator 126 won't propagate an exit speed sign to non-exit lanes. Further, an electronic sign may only apply to its closest lane and may not propagate to other adjacent lanes. These considerations may be accounted for in propagation and/or grouping described herein and may be encoded as rules and/or hard or soft constraints.

Figure 4:
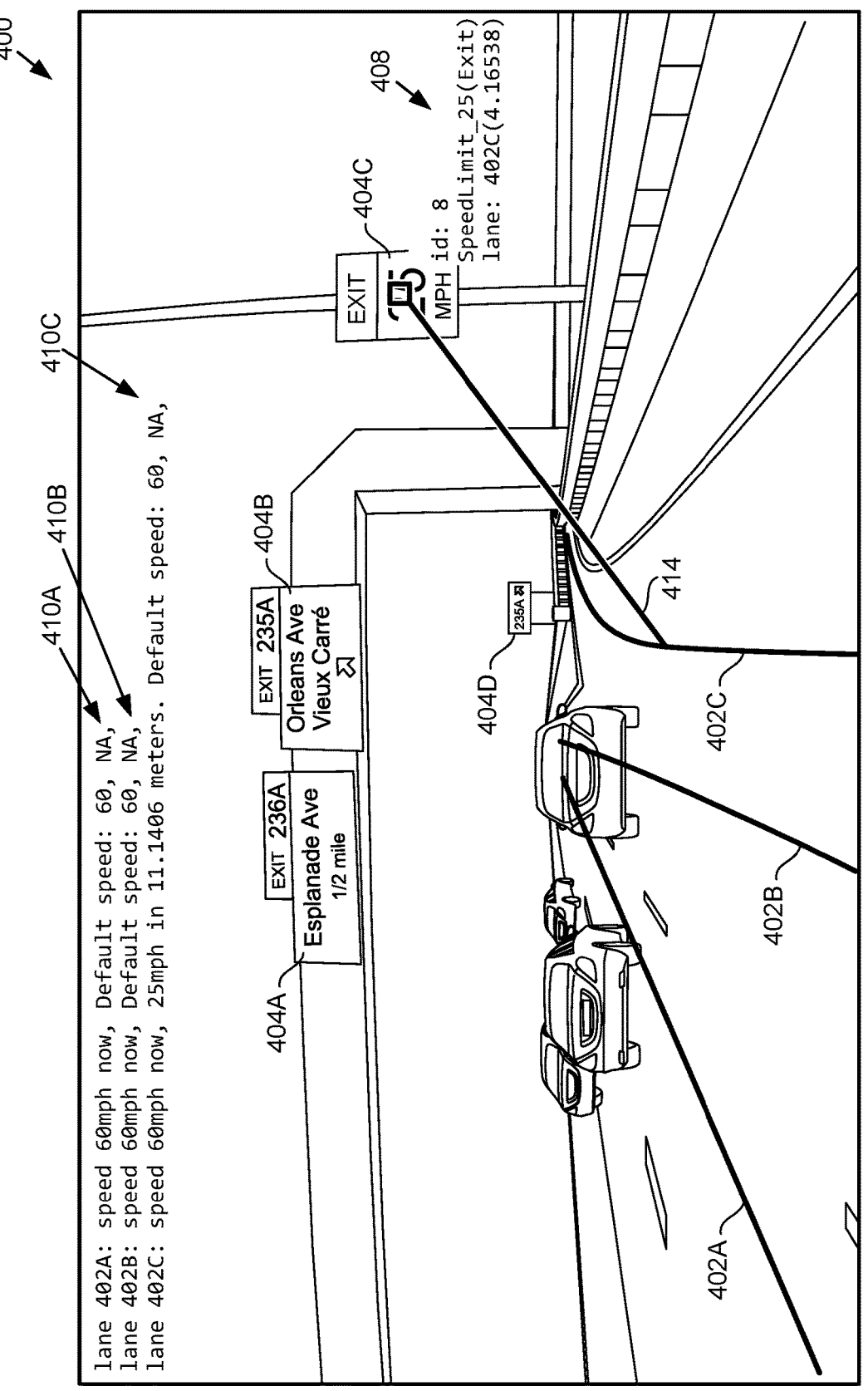
FIG. 4 depicts examples of lanes, signs, parameters, and attributes that may be derived from input data, in accordance with some embodiments of the present disclosure.

Referring now to FIG. 4, FIG. 4 depicts examples of lanes, signs, parameters, and attributes that may be derived from input data, in accordance with some embodiments of the present disclosure. For example, the input data may correspond to an input frame 400, which is shown with an overlay corresponding to information which may have been determined based at least on analyzing the input frame 400 (and/or other images and/or other sensor data representations (e.g., point clouds, projection images, etc.) generated using one or more sensors of the vehicle or machine 1000).

FIG. 4 shows lanes 402A, 402B, and 402C, which may be referred to as lanes 402 (indicated by centerlines), which may be included in the lane graph 152 of FIG. 1. FIG. 4 also shows signs 404A, 404B, 404C, and 404D, which may be referred to as signs 404 and may be included in the sign signals provided using the signal perceiver 140. FIG. 4 also shows an example of sign information 408 which the signal analyzer 160 may determine for the sign 404A using the base rule parser 164. FIG. 4 also shows examples of lane information 410A, 410B, and 410C, which the geometry associator 126 may associate with one or more of the lanes 402. For example, the lane information 410C may be based at least on the sign information 408 for the sign 404C.

In at least one embodiment, after the geometry associator 126 assigns and propagates one or more signs (and/or sign groups) to one or more lanes, one or more lanes may have multiple associated signs which divide a lane into multiple segments. The geometry associator 126 may determine a segment, for example, based at least on determining a location associated with a sign along a lane and defining the segment of the lane using the location. For example, the location may be indicated by (correspond to) a line 414 between the lane 402C and the sign 404C in FIG. 4. In one or more embodiments, the geometry associator 126 may merge one or more lane segments of a lane based at least on associated sign attributes (e.g., sign type, distance to the lane, etc.) and/or traffic rules (e.g., electric signs overwrite paint signs) to generate merged, composite, and/or final lane segments. Each lane segment may carry corresponding attributes or parameters (e.g., max speed, min, and/or advisory speed), which may be captured in the semantic data 168 and/or the data structure 166.

In one or more embodiments, a default road speed (and/or other default parameters) may be stored in memory so that the vehicle or other machine can fall back to the default road speed, such as when the data structure 166 and/or the semantic data 168 indicates an end of a speed parameter for one or more lanes.

Now referring to FIGS. 5-9, each block of methods 500, 600, 700, 800, and 900, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 500, 600, 700, 800, and 900 may be described, by way of example, with respect to the system 100 of FIG. 1. However, these methods may additionally or alternatively be executed by any one system, or any combination of systems, including, but not limited to, those described herein.

Figure 5:
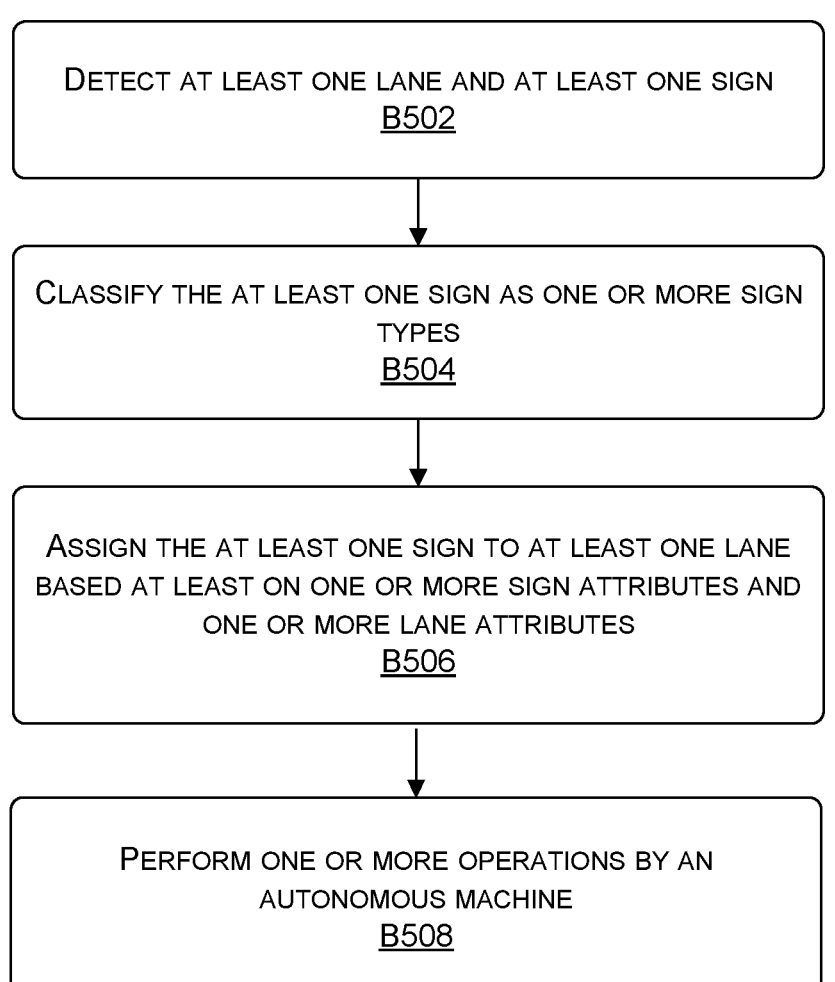
FIG. 5 is a flow diagram for a method for associating at least one sign with at least one lane, in accordance with some embodiments of the present disclosure.

FIG. 5 is a flow diagram showing a method 500 for associating at least one sign with at least one lane, in accordance with some embodiments of the present disclosure. The method 500, at block B 502, includes detecting at least one lane and at least one sign. For example, the sign detector 104 and lane or path perception may detect, based at least on sensor data generated using one or more sensors of an autonomous machine 1000, at least one lane and at least one sign in an environment.

The method 500, at block B504, includes classifying the at least one sign as one or more sign types. For example, the sign classifier 108 may classify, using one or more Machine Learning Models (MLMs), the at least one sign as one or more sign types.

The method 500, at block B506, includes assigning the at least one sign to at least one lane based at least on one or more sign attributes and one or more lane attributes. For example, the geometry associator 126 may assign the at least one sign to the at least one lane based at least on one or more sign attributes associated with the at least one sign and one or more lane attributes associated with the at least one lane.

The method 500, at block B508, includes performing one or more operations by an autonomous machine. For example, the vehicle 1000 may perform one or more operations using one or more parameters associated with the one or more sign types based at least on the assignment of the at least one sign to the at least one lane.

Referring now to FIG. 6, FIG. 6 is a flow diagram for a method 600 for propagating an assignment of at least one sign to at least one lane based at least on similarities between geometry information between lanes, in accordance with some embodiments of the present disclosure. The method 600, at block B602, includes evaluating similarities between geometry information associated with lanes. For example, the geometry associator 126 may evaluate, based at least on geometry information corresponding to lanes in an environment of the vehicle 1000, similarities between the respective geometry information associated with the lanes.

The method 600, at block B604, includes grouping the lanes into at least a group based at least on the similarities. For example, the geometry associator 126 may group one or more first lanes of the lanes with one or more second lanes of the lanes into a group based at least on the similarities.

The method 600, at block B606, includes assigning at least one sign to one or more first lanes of the group. For example, the geometry associator 126 may assign at least one sign detected in the environment to the one or more first lanes based at least on one or more distances between the at least one sign and the one or more first lanes.

The method 600, at block B608, includes propagating the assignment to one or more second lanes in the group. For example, the geometry associator 126 may propagate the assignment to at least one of the one or more second lanes in the group.

The method 600, at block B610, includes performing one or more operations by an autonomous machine. For example, the vehicle 1000 may perform one or more operations using one or more parameters associated with the one or more sign types based at least on the assignment of the at least one sign to the at least one lane.

Referring now to FIG. 7, FIG. 7 is a flow diagram for a method 700 for propagating an assignment of at least one sign to at least one lane based at least on lane attributes, in accordance with some embodiments of the present disclosure. The method 700, at block B702, includes grouping lanes into at least a group based at least on one or more lane attributes. For example, the geometry associator 126 may group lanes detected in an environment of an autonomous machine 1000 into at least a group based at least on one or more lane attributes associated with the lanes.

The method 700, at block B704, includes assigning at least one sign to one or more first lanes based at least on the one or more lane attributes. For example, the geometry associator 126 may assign at least one sign detected in the environment to one or more first lanes of the lanes based at least on the one or more lane attributes.

The method 700, at block B706, includes propagating the assignment to one or more second lanes. For example, the geometry associator 126 may propagate the assignment to one or more second lanes based on the one or more first lanes and the one or more second lanes belonging to the group.

The method 700, at block B708, includes performing one or more operations by an autonomous machine. For example, the vehicle 1000 may perform one or more operations using one or more parameters associated with the one or more sign types based at least on the assignment of the at least one sign to the at least one lane.

Referring now to FIG. 8, FIG. 8 is a flow diagram for a method 800 for grouping signs, in accordance with some embodiments of the present disclosure. The method 800, at block B802, includes detecting signs in an environment. For example, the sign detector 104 may detect, based at least on sensor data generated using one or more sensors of the vehicle 1000, signs in an environment.

The method 800, at block B804, includes grouping a first sign of the signs with a second sign of the signs into a group based at least on one or more sign attributes. For example, the sign grouper 110 may group a first sign of the signs with a second sign of the signs into a group based at least on one or more attributes of the signs.

The method 800, at block B806, includes assigning one or more parameters associated with the first sign and the second sign to the group. For example, the geometry associator 126 and/or the signal analyzer 160 may assign one or more parameters associated with the first sign and the second sign to the group.

The method 800, at block B 808, includes performing one or more operations by an autonomous machine. For example, the vehicle 1000 may perform one or more operations using one or more parameters associated with the one or more sign types based at least on the assignment of the at least one sign to the at least one lane.

Figure 9:
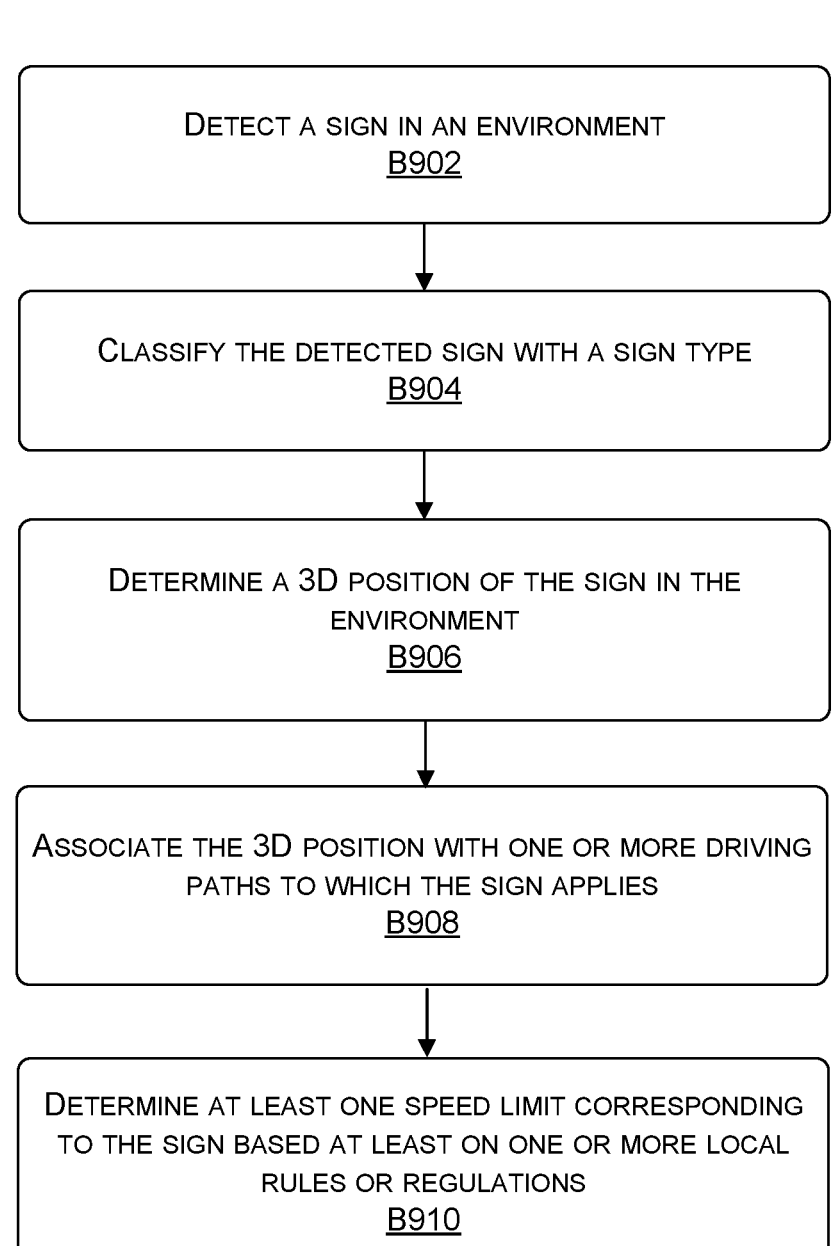
FIG. 9 is a flow diagram for a method for determining at least one speed limit corresponding to a sign, in accordance with some embodiments of the present disclosure.

Referring now to FIG. 9, FIG. 9 is a flow diagram for a method 900 for determining at least one speed limit corresponding to a sign, in accordance with some embodiments of the present disclosure. The method 900, at block B902, includes detecting a sign in an environment. For example, the sign detector 104 may detect a sign in an environment of the vehicle 1000.

The method 900, at block B904, includes classifying the detected sign with a sign type. For example, the sign classifier 108 may classify the detected sign with a sign type.

The method 900, at block B906, includes determining a 3D position of the sign in the environment. For example, the sign tracker 106 may triangulate a 3D position of the sign within the environment.

The method 900, at block B908, includes associating the 3D position with one or more driving paths to which the sign applies. For example, the geometry associator 126 may associate the 3D position with one or more driving paths to which the sign applies.

The method 900, at block B910, includes determining at least one speed limit corresponding to the sign based at least on one or more local rules or regulations. For example, the signal analyzer 160 may use the base rule parser to interpret at least one of a maximum, a minimum, or an advisory speed limit corresponding to the sign based at least on one or more local rules or regulations.

Example Autonomous Vehicle

Figure 10A:
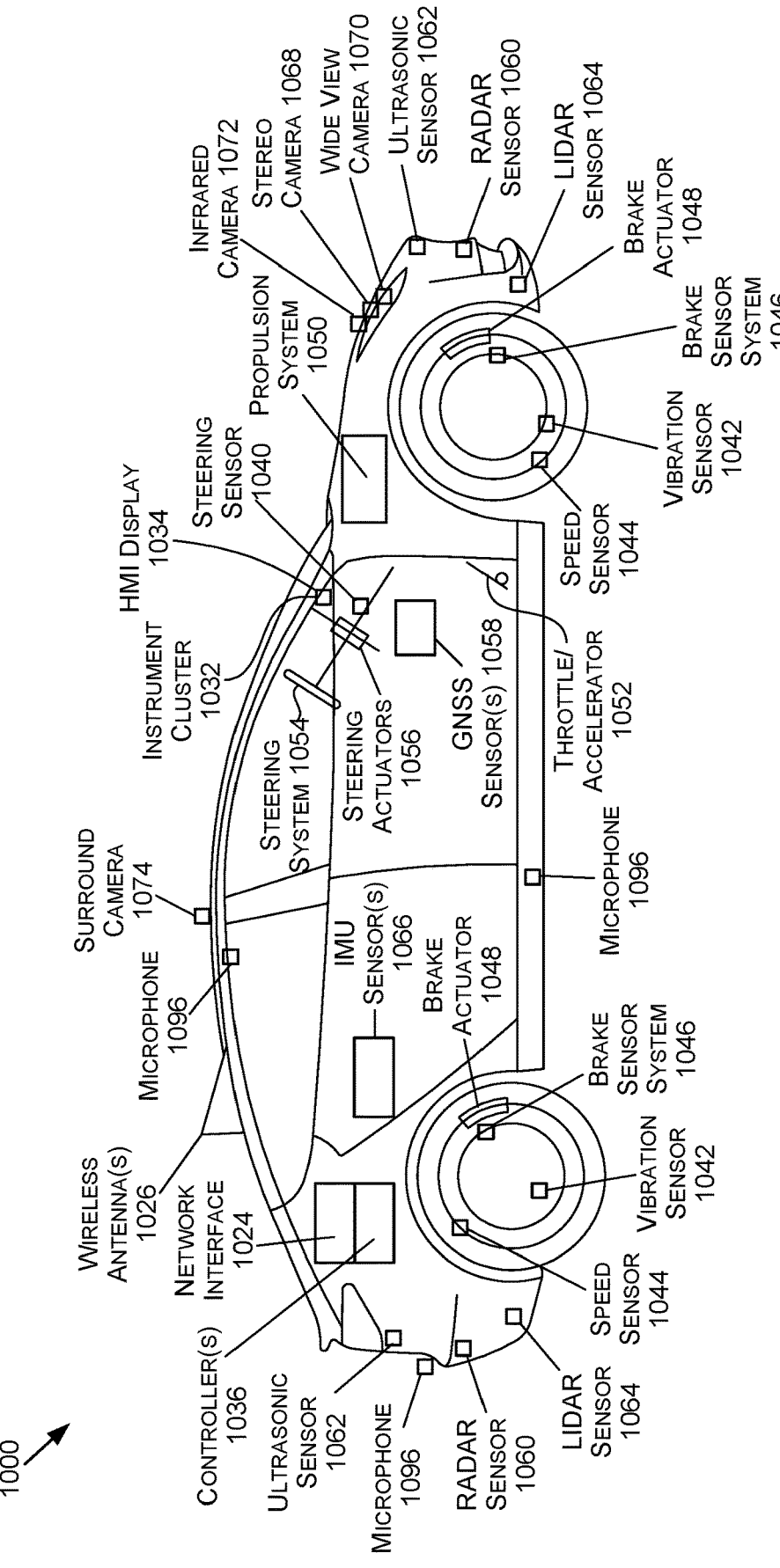
FIG. 10A is an illustration of an example autonomous vehicle, in accordance with some embodiments of the present disclosure.

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. The vehicle 1000 may be capable of functionality in accordance with one or more of Level 1-Level 5 of the autonomous driving levels. For example, the vehicle 1000 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1000 or other machine, such as being fully autonomous, being highly autonomous, being conditionally autonomous, being partially autonomous, providing assistive autonomy, being semi-autonomous, being primarily autonomous, or other designation.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/ or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the HD map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over LTE, WCDMA, UMTS, GSM, CDMA2000, etc. The wireless antenna(s) 1026 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN, SigFox, etc.

Figure 10B:
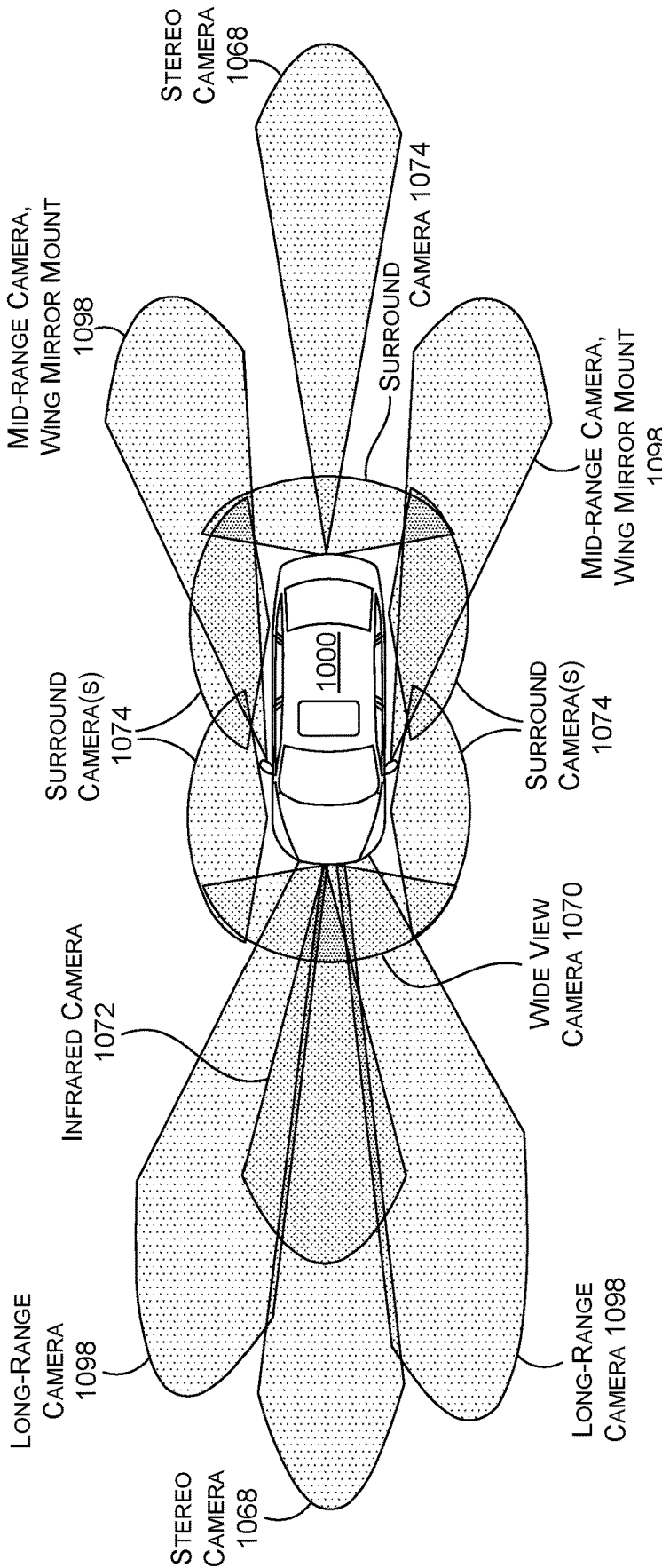
FIG. 10B is an example of camera locations and fields of view for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may any number of wide-view cameras 1070 on the vehicle 1000. In addition, long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

One or more stereo cameras 1068 may also be included in a front-facing configuration. The stereo camera(s) 1068 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 10C:
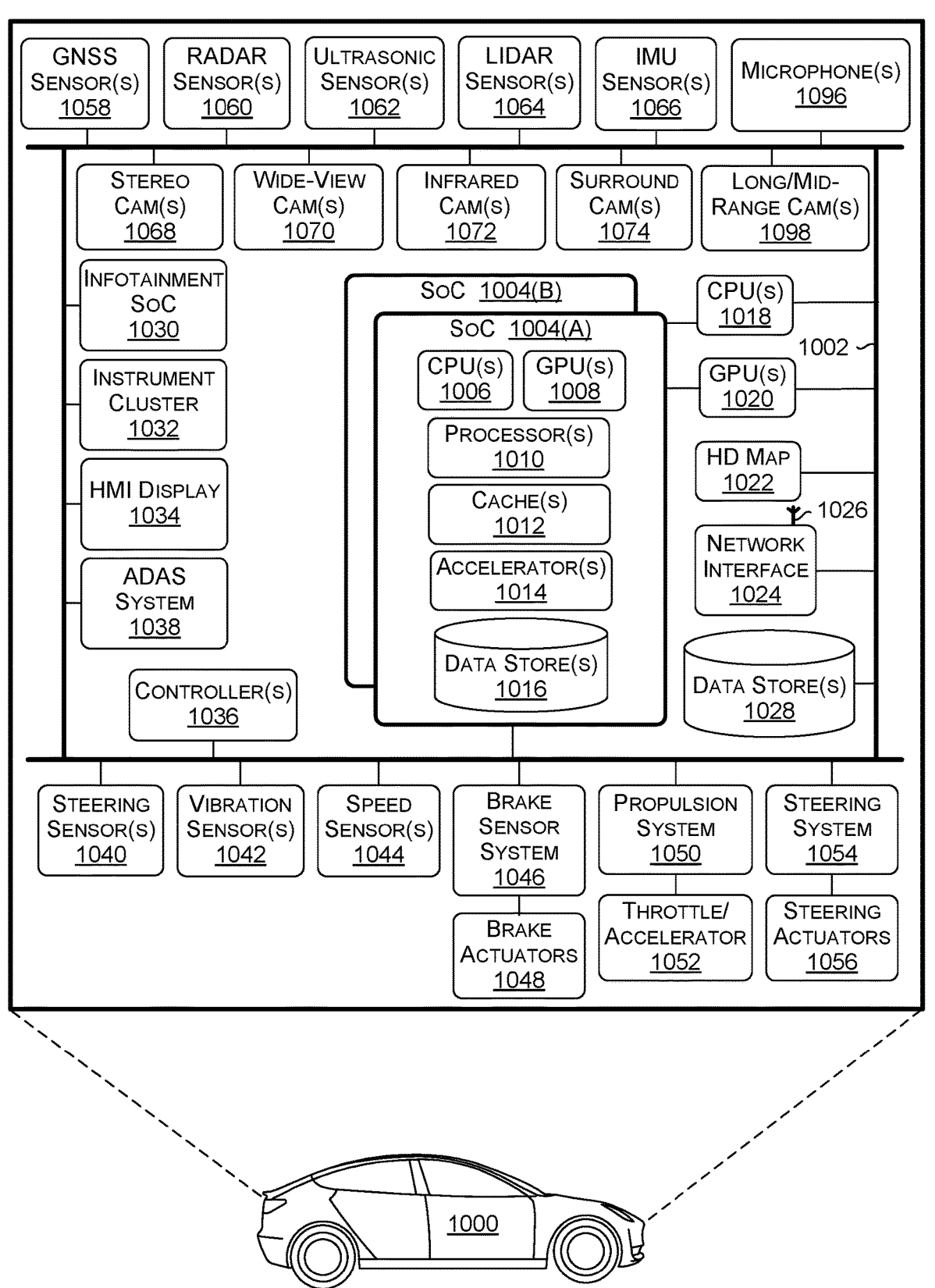
FIG. 10C is a block diagram of an example system architecture for the example autonomous vehicle of FIG. 10A, in accordance with some embodiments of the present disclosure.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link.

The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000 m, with an accuracy of 2 cm-3 cm, and with support for a 1000 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
FIG. 10D is a system diagram for communication between cloud-based server(s) and the example autonomous vehicle of FIG. 10A, in accordance with some embodiments of the present disclosure.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
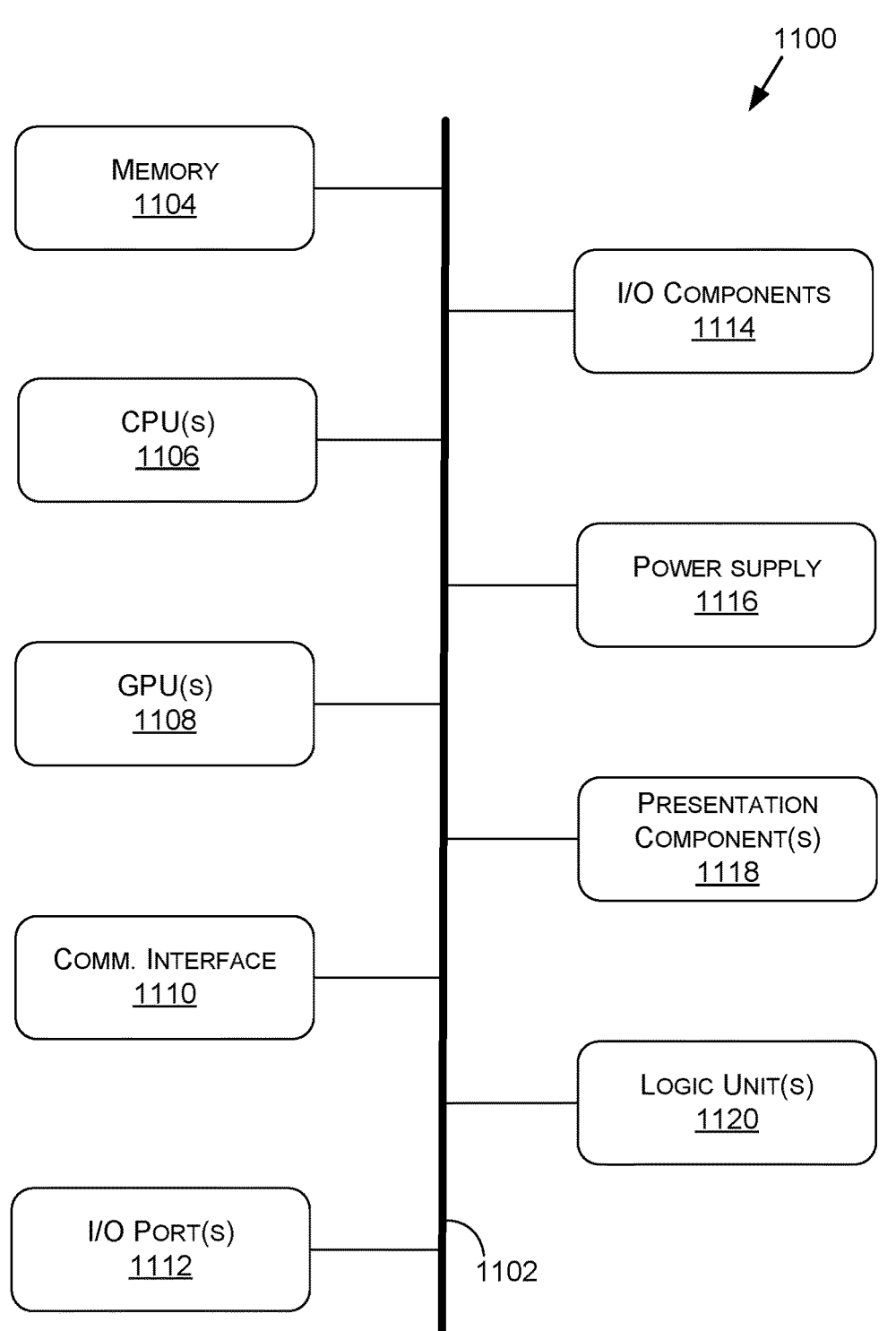
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

Figure 12:
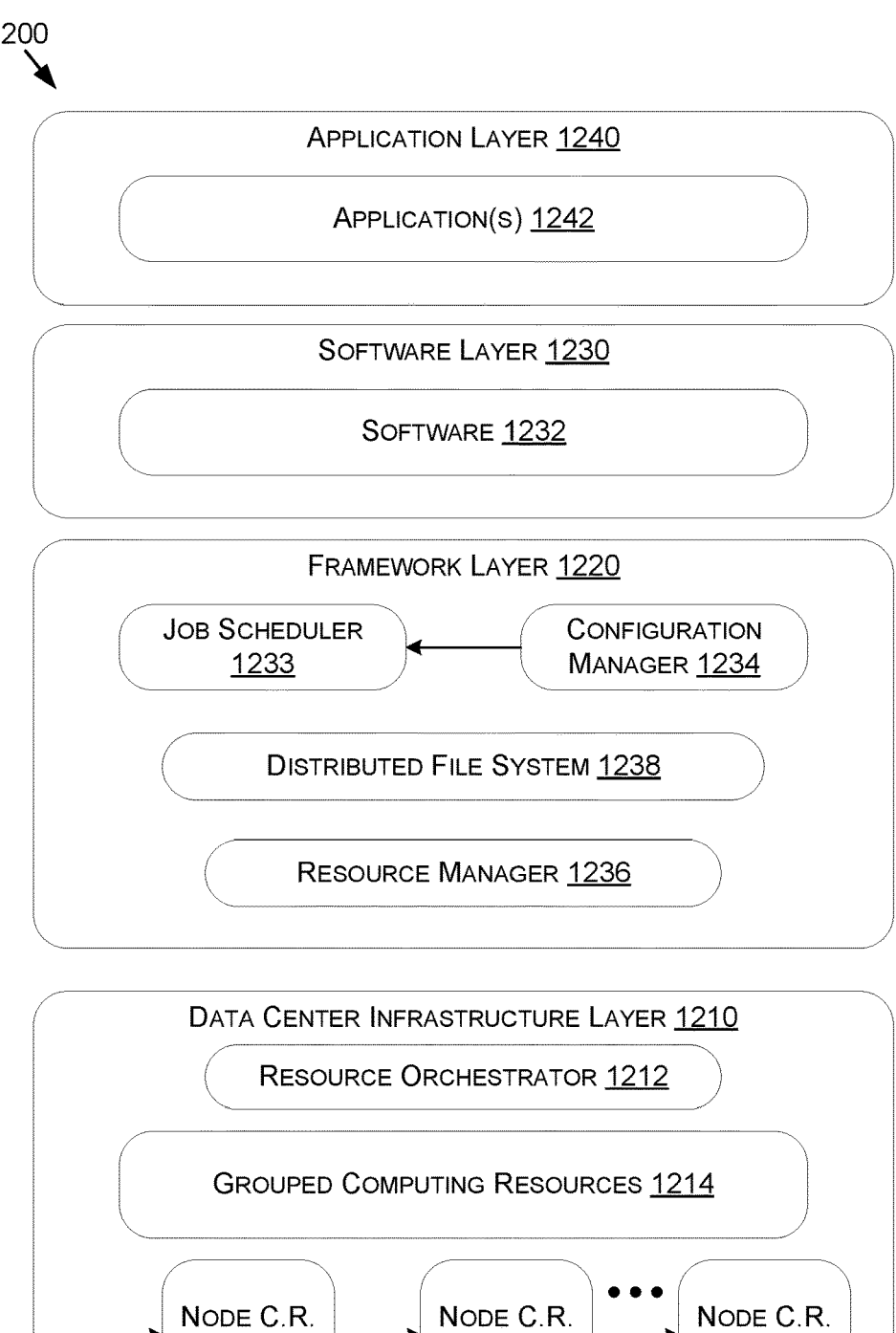
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161(N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1233, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1233 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1233. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216 (1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

detecting, based at least on sensor data obtained using one or more sensors, at least one lane and at least one sign in an environment;

assigning one or more semantic attributes of the at least one sign to the at least one lane based at least on one or more sign attributes associated with the at least one sign and one or more lane attributes associated with the at least one lane;

computing, using first lane attributes of the at least one lane and second lane attributes of a lane, a matching score indicating a level of similarity between the first lane attributes and the second lane attributes;

based at least on the assignment of the one or more semantic attributes to the at least one lane and the matching score exceeding a threshold value, evaluating the lane using one or more propagation constraints that correspond to the at least one sign;

based at least on the evaluating indicating the lane satisfies the one or more propagation constraints, propagating the one or more semantic attributes of the at least one sign from the at least one lane to the lane; and based at least on the one or more semantic attributes being propagated to the lane, controlling one or more of autonomous or semi-autonomous braking, steering, or acceleration of a machine based at least on the one or more semantic attributes.

2. The method of claim 1, further comprising determining the one or more semantic attributes based at least on one or more sign types and a geographic region of the at least one sign, and the evaluating of the one or more propagation constraints includes determining that a lane type of the lane is compatible with the one or more sign types of the at least one sign using a set of criteria encoded in and selected based at least one the one or more sign types.

3. The method of claim 1, further comprising determining the one or more semantic attributes, at least in part, by:

identifying one or more regulatory rules associated with the at least one sign based at least on a type of the at least one sign; and parsing the one or more regulatory rules to extract the one or more semantic attributes, wherein the one or more propagation constraints include a semantic compatibility check that prevents propagation of the one or more semantic attributes to the lane if a semantic meaning of the at least one sign is incompatible with a lane type of the lane, the semantic compatibility check being derived from the one or more regulatory rules.

4. The method of claim 1, further comprising:

classifying, using one or more machine learning models (MLMs), the at least one lane as corresponding to one or more lane types; and identifying an association between one or more sign types of the at least one sign and the one or more lane types, wherein the assigning the at least one sign to the at least one lane is based at least on the association being identified.

5. The method of claim 1, wherein the at least one sign includes a first sign and a second sign, and the assigning comprises assigning the first sign and the second sign to the at least one lane based at least on classifying the first sign as a primary sign and the second sign as a supplemental sign corresponding to the first sign.

6. The method of claim 1, wherein the one or more lane attributes correspond to:

one or more roadmarks associated with the at least one lane; or one or more lane types assigned to the at least one lane.

7. The method of claim 1, wherein the computing includes:

computing pair-wise matching scores between sets of lanes; and based at least on the pair-wise matching scores, grouping the lanes into a plurality of groups, wherein the at least one lane is included in at least two groups of the plurality of groups and the evaluating is performed based at least on the lane being included in one or more of the at least two groups with the at least one lane.

8. The method of claim 1, wherein the one or more propagation constraints include one or more hard constraints and one or more soft constraints on propagation of the one or more semantic attributes of the at least one sign to the lane.

9. The method of claim 1, wherein the assigning of the at least one sign to the at least one lane comprises:

determining, in an image in which the at least one lane, the at least one sign, and the lane were detected using image analysis, a location associated with a sign of the at least one sign along a lane of the at least one lane;

defining, in the image, a segment of the lane using the location; and assigning the sign to the segment.

10. The method of claim 1, wherein the one or more lane attributes correspond to one or more lane types that include one or more of:

an exit lane;

a turn lane;

an entry lane;

a carpool lane;

a forking lane; or a merging lane.

11. The method of claim 1, wherein the one or more propagation constraints vary based at least on a type of the at least one sign, such that a first set of the one or more propagation constraints applies to a first type of sign and a second set of the one or more propagation constraints applies to a second type of sign different from the first type of sign.

12. The method of claim 1, further comprising, based at least on the matching score, grouping a plurality of lanes having different categories of lane type into a common group, and the one or more propagation constraints correspond to one or more constraints on one or more categories of lane type that can be propagated to using the at least one sign.

13. A system comprising:

one or more processing units to execute operations comprising:

computing, using lane attributes indicating geometry information and semantic information corresponding to a plurality of lanes in an environment of a machine, matching scores indicating levels of similarity between the lane attributes;

grouping one or more first lanes of the plurality of lanes with one or more second lanes of the plurality of lanes into a group based at least on the matching scores between the one or more first lanes and the one or more second lanes exceeding a threshold value;

assigning one or more semantic attributes of at least one sign detected in the environment to at least one first lane of the one or more first lanes based at least on one or more distances between the at least one sign and the at least one first lane;

based at least on one or more lanes being in the group with the at least one first lane and the assignment of the one or more semantic attributes to the at least one first lane, evaluating the one or more lanes using one or more propagation constraints that correspond to the at least one sign;

based at least on the evaluating indicating the one or more lanes satisfy the one or more propagation constraints, propagating the one or more semantic attributes of the at least one sign from the at least one first lane to the one or more lanes; and controlling one or more of braking, steering, or acceleration of the machine based at least on the one or more semantic attributes being propagated to the one or more lanes.

14. The system of claim 13, wherein the grouping is further based at least on evaluating one or more similarities between at least one of:

one or more roadmarks associated with the plurality of lanes; or one or more lane types assign to the plurality of lanes.

15. The system of claim 13, wherein the lane attributes, the plurality of lanes, the at least one sign, the one or more distances, are each extracted from an image of the environment, and the assignment and the propagating in with respect to the image.

16. The system of claim 13, wherein the assigning comprises:

determining a location associated with a sign of the at least one sign along a first lane of the one or more first lanes;

defining a segment of the first lane using the location; and assigning the sign to the segment.

17. The system of claim 13, wherein the assigning comprises assigning a first sign detected in the environment and a second sign detected in the environment to the one or more first lanes based at least on classifying the first sign as a primary sign and the second sign as a supplemental sign corresponding to the first sign.

18. The system of claim 13, wherein the geometry associated with the plurality of lanes is determined based at least on applying sensor data generated using one or more sensors of the machine to one or more machine learning models.

19. The system of claim 13, wherein the system comprises or is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

20. At least one processor comprising:

one or more circuits to control one or more of braking, steering, or acceleration of a machine based at least on a propagation of one or more semantic attributes of a sign to one or more first lanes from one or more second lanes, wherein the propagation is based at least on:

generating an assignment of the one or more semantic attributes of the sign to the one or more second lanes, computing, using first lane attributes of the one or more second lanes and second lane attributes of the one or more first lanes, one or more matching scores indicating one or more levels of similarity between the first lane attributes and the second lane attributes, and based at least on the assignment of the one or more semantic attributes to the one or more second lanes and the one or more matching scores exceeding a threshold value, evaluating the one or more first lanes using one or more propagation constraints that correspond to the sign.

21. The at least one processor of claim 20, wherein the first lane attributes comprise one or more locations associated with the one or more second lanes, and the assignment of the sign to the one or more second lanes is based at least on one or more distances between the one or more locations and the sign.

22. The at least one processor of claim 20, wherein the first lane attributes represent at least one of:

geometry associated with the one or more first lanes and the one or more second lanes;

one or more lane types associated with the one or more first lanes and the one or more second lanes; or one or more roadmarks associated with the one or more first lanes and the one or more second lanes.

23. The at least one processor of claim 20, wherein the at least one processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *